United States Patent
Fidric et al.

(10) Patent No.: US 6,434,302 B1
(45) Date of Patent: Aug. 13, 2002

(54) OPTICAL COUPLERS FOR MULTIMODE FIBERS

(75) Inventors: Bernard G. Fidric, Cupertino; Vincent G. Dominic, Fremont; Steven Sanders, Belmont, all of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/262,942

(22) Filed: Mar. 4, 1999

Related U.S. Application Data (60) Provisional application No. 60/076,772, filed on Mar. 4, 1998.

(51) Int. Cl.[7] .................................................. G02B 6/26
(52) U.S. Cl. .......................................... 385/43; 385/48
(58) Field of Search .............................. 385/43, 48, 33, 385/34, 123–127, 141, 142, 6

(56) References Cited

U.S. PATENT DOCUMENTS

| | | | |
|---|---|---|---|
| 3,808,549 A | 4/1974 | Maurer | 331/94.5 |
| 4,291,940 A | 9/1981 | Kawasaki et al. | 350/96.15 |
| 4,815,079 A | 3/1989 | Snitzer et al. | 372/6 |
| 4,820,010 A | 4/1989 | Scifre et al. | 350/96 |
| 5,170,458 A | 12/1992 | Aoyagi et al. | 385/127 |
| 5,263,036 A | 11/1993 | De Bernardi et al. | 372/6 |
| 5,268,978 A | 12/1993 | Po et al. | 385/33 |
| 5,355,426 A | 10/1994 | Daniel et al. | 385/39 |
| 5,459,804 A | * 10/1995 | Stowe | 385/42 |
| 5,553,179 A | * 9/1996 | Cryan et al. | 385/43 |
| 5,864,644 A | 1/1999 | DiGiovanni et al. | 385/43 |
| 6,134,362 A | * 10/2000 | Au-Yeung et al. | 385/43 |

FOREIGN PATENT DOCUMENTS

| | | | |
|---|---|---|---|
| EP | 0 234 325 A | 9/1987 | G02B/6/28 |
| EP | 0 486 297 A | 5/1992 | G02B/6/28 |
| EP | 0 893 862 A2 | 1/1999 | H01S/3/06 |
| JP | 60-150011 | 7/1985 | G02B/6/28 |
| WO | WO 96/20519 | 7/1996 | H01S/3/06 |

* cited by examiner

Primary Examiner—Frank G. Font
Assistant Examiner—Layla Lauchman
(74) Attorney, Agent, or Firm—Allen, Dyer, Doppelt, Milbrath & Gilchrist, P.A.

(57) ABSTRACT

Optical couplers functioning, for example, as fiber optic combiners or fiber optic splitters for multimode fibers are disclosed for coupling, for example, the light output of a plurality of multimode laser sources into a multimode output fiber or fibers. Coupling combinations include multimode fibers to multimode fiber or fibers (MMFs/MMF(s)) or multimode fibers/single mode fiber to double clad fiber (MMFs/SMF/DCF). Improvements are disclosed in coupling efficiency and the power distribution uniformity of optical power into an output fiber, such as double clad fiber inner cladding or multimode fiber core, from multiple multimode input fibers. Power distribution uniformity can be significantly improved by having the multimode fiber bundled region taper converging down to a minimum waist having a diameter, $D_0$, where the input light from the multimode input fibers substantially fills the entire numerical aperture (NA) of an air-clad region of the couple, where $NA \approx 1$, followed by an adiabatic diverging taper up to the nominal cladding or core diameter, $D_{output}$, of the output fiber or combined fibers.

12 Claims, 5 Drawing Sheets

POWER DISTRIBUTION AT $D_{OUTPUT}$

FIG._14
(PRIOR ART)

POWER DISTRIBUTION AT THE WAIST

FIG._15A

POWER DISTRIBUTION AT THE OUTPUT $D_{OUTPUT}$, $NA_{OUTPUT} < 1$

OPTICAL COUPLERS FOR MULTIMODE FIBERS

REFERENCE TO A RELATED APPLICATION

This application claims the benefit of provisional application, Serial No. 60/076,772 filed Mar. 4, 1998, entitled FUSED OPTICAL COUPLERS FOR DOUBLE CLAD FIBERS, which is incorporated herein by its reference.

FIELD OF THE INVENTION

This invention relates generally to optical couplers and more particularly to optical couplers of multimode fibers to multimode fibers including double clad fibers.

BACKGROUND OF THE INVENTION

This invention deals with pump modules that provide for the optical coupling or transfer of light from one or more light sources, such as semiconductor lasers, via individual multimode fibers into a multimode fiber or into a multimode cladding, single mode core optical fiber functioning, for example, as a fiber laser or a fiber amplifier. One of the most prevalent applications for such modules is the optical pumping of optical fiber amplifiers (OFA's), such as 1550 nm Er doped fiber amplifiers (EDFAs) employed in wavelength division multiplexed (WDM) or dense wavelength division multiplexed (DWDM) transmission networks.

Such amplifier devices may be comprised of a single mode fiber and, more recently, a double clad fiber, either of which have a core that is doped with an active lasing element, such as a rare earth material. Double clad fibers are disclosed and described in U.S. Pat. Nos. 3,808,549 and 4,815,079. The signal to be amplified is propagated through the core while pump light at an appropriate absorption wave-length is also coupled into the core of the single mode fiber but in the case of a double clad fiber, is coupled into the inner cladding. The double clad fiber is favored in high power systems over the single mode fiber since the inner cladding provides for larger amount of pump power to be supplied into the fiber resulting in higher amplification of the signal output of the fiber amplifier. Thus, one or more diode laser arrays, for example, may be coupled via bulk optics to the input end face of a double clad fiber, i.e., into the double clad fiber inner cladding. Examples of multiple source pumping schemes in conjunction with a double clad fiber are shown in U.S. Pat. Nos. 5,263,036 and 5,268,978.

Of particular interest is to couple the light from multiple semiconductor light sources, via a plurality of multimode fibers, into a double clad fiber. PCT Publication WO 96/20519 (PCT/IT94/00218), published Jul. 4, 1996, discloses the optical coupling of a multimode laser source into a multimode fiber which is fused to a double clad fiber that includes a core for carrying a signal to be amplified. However, PCT Publication WO 96/20519 provides for the coupling of only one multimode laser source multimode fiber to a segment of a double clad fiber.

A recently issued patent to DiGiovanni et al., U.S. Pat. No. 5,864,644, discloses the formation of a fused coupler comprising a plurality of multimode fibers that are fusion-spliced at the combined end to a double clad fiber, which patent is incorporated herein by its reference. As indicated in the patent, the numerical aperture (NA) of the multiple multimode fibers would naturally be less than the numerical aperture (NA) of the double clad fiber. The multimode fibers are tightly bundled together in a close-pack formation and drawn at high temperature to form a fused coupler as shown in the patent, which is a drawing process similar to forming biconical fused couplers but having significantly different properties. As shown in FIG. 1 of the patent, a plurality of such multimode fibers fused to form a tapered bundle and then spliced to a double clad fiber with substantially matching NA's between the fused bundle and the inner multimode cladding of a double clad fiber.

Fused bundled multimode fibers are known in the art. As set forth in U.S. Pat. No. 4,820,010 to Scifres et al., multimode fibers, illustrated in FIGS. 3 and 4 of the patent, are heated, pulled and fused in a bundle without any accompanying air gaps between the fused fibers as indicated in FIGS. 13 and 14. See also U.S. Pat. No. 4,291,940 that discloses coupler for coupling of two multimode optical fibers via a biconical taper section. Also, U.S. Pat. No. 5,170,458 discloses a coupler for coupling both a multimode fiber and a single mode fiber to a double clad fiber.

U.S. Pat. No. 5,864,644 discloses the bundling together of multimode fibers about a central single mode fiber from which the fused tapered coupler is formed and fusion-spliced with substantially matching NA's to a double clad fiber and with optical alignment of the single mode fiber core to the double clad fiber core at the point of splice.

While the concepts in these patent references relate to N×M fused biconical tapered couplers in the form of optical combiners, they are equally applicable to optical splitters, such as the type illustrated in U.S. Pat. No. 5,355,426.

However, the problem with the type of couplers illustrated in U.S. Pat. No. 5,864,644 is the lack of optical power uniformity or optical power distribution into the coupled multimode or double clad fiber. It is best that the input light from the fused tapered coupled region fill uniformly the entire numerical aperture (NA) of the multimode fiber or double clad fiber splice-coupled to the output of the coupler. This cannot be successfully accomplished by the designs illustrated in U.S. Pat. No. 5,864,644.

Thus, what is needed is a way to couple multiple multi-mode laser sources, via multiple multimode fibers (MMFs), to a multimode fiber (MMF) or a double clad fiber (DCF) that provides for improved optical power distribution properties in the latter fiber.

SUMMARY OF THE INVENTION

According to this invention, an optical coupler, that may function as an optical combiner or an optical splitter, comprises a plurality of combined multimode fibers bundled and fused together and pulled to form a coupler that ha a converging or monotonically decreasing taper down to a minimum diametrical waist followed by a diverging or montonically increasing taper, also referred to as a negative taper extending to a nominal diameter of an output fiber or combined output fibers and is optically coupled thereto such as by means of fusion-splicing. The minimum diametrical waist is sufficiently small so that the input light from the combined multimode fibers substantially fills the entire numerical aperture (NA) of the output fiber so that, upon divergence from the waist, the NA of the output fiber will be substantially filled with propagating light distributed uniformly within the waist. The waist is not so small as to bring about substantial loss of the propagating light. The output fiber may be a multimode fiber or a plurality of combined and fused multimode fibers having an NA input substantially matching the NA output from the diverging taper of the coupler. The output fiber may also be a core-doped double clad fiber where the NA output substantially matching the NA output from the diverging taper is the double clad fiber inner cladding, also referred to at times as the pump cladding. The diverging taper may also be a portion of the input of the output fiber. In another embodiment, a single mode fiber may be combined with a plurality of multimode fibers to form a fused converging-to-diverging taper coupler having an output substantially matching the NA of the NA of the output fiber. Disclosed are several ways for forming the minimum diametrical waist followed by the monotonically increasing taper.

In a disclosed embodiment, a multimode fibers/single mode fiber to double clad fiber optical (MMFs/SMF/DCF) coupler comprises a single mode fiber with a first core, a plurality of multimode fibers bundled around said single mode fiber forming a bundled arrangement and a double clad fiber having an inner cladding with a second core. The bundled arrangement is fused and, then, an end of the double clad fiber is butt coupled to an end of the fused, bundled arrangement with the first and second cores in aligned relation. The fused, bundled arrangement has a diametrical cross-section substantially equal to the diametrical cross-section of the double clad fiber inner cladding. The multimode fibers may be pre-tapered to provide, in combination, the diametrical cross-section substantially equal to the diametrical cross-section of the double clad fiber inner cladding. Alternatively, the optical coupler may be provided to have a tapered shape and is cut at a length to provide the diametrical cross-section substantially equal to the diametrical cross-section of the double clad fiber inner cladding. Also, alternatively, a portion of the single mode fiber cladding surrounding the first core may be removed prior to forming the bundled arrangement.

The coupler of this invention may be coupled to a multimode fiber for optical power delivery to an optical component or coupled to double clad fiber functioning as a fiber laser or fiber amplifier.

In another embodiment of this invention, an optical coupler comprises a multimode fiber having a multimode core and a double clad fiber having an inner cladding with a single mode core. Selected segments of the fibers are twisted and fused together to form an optical coupling between the multimode fiber and the inner cladding of the double clad fiber. Preferably, a portion the cladding of the multimode fiber is removed or tapered so that the coupling efficiency between the multimode fiber and the double clad fiber is enhanced.

A further embodiment relates to a method of forming an optical coupler comprising the steps of providing a plurality of multimode fibers, tapering the end portions of the multimode fibers, bundling the tapered end portions of the multimode fibers about a single mode fiber, and fusing all the bundled fibers together. A double clad fiber having an inner cladding with a predetermined diameter is provided for butt coupling an end of the fused fibers to an end of the double clad fiber. The method further includes the step of selecting the amount taper of the multimode fiber end portions so that the resulting diameter of the bundled tapered end portions together with the single mode fiber approximates the predetermined diameter after their fusing.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS OF THE INVENTION

Figure 1:
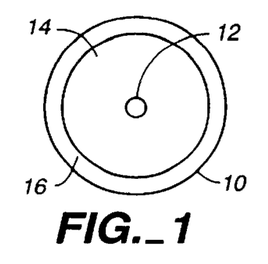
FIG. 1 is a cross section of a double clad fiber (DCF).
Figure 2:
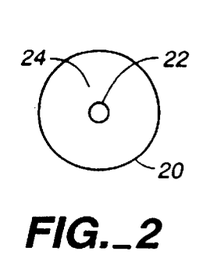
FIG. 2 is a cross section of a single mode fiber (SMF).
Figure 3:
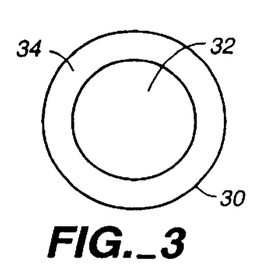
FIG. 3 is a cross section of a multimode fiber (MMF).

Reference is now made to FIGS. 1–3 and the description associated with those figures. In FIG. 1, the double clad fiber (DCF) 10 comprises a core 12, a lower index inner cladding 14 and lowest index outer cladding 16. The inner cladding 14 has a diameter of $d_1$ and a numerical aperture of $NA_1$. The core 12 has mode field diameter of $2w_1$.

In FIG. 2, the single mode fiber (SMF) 20 has a core 22 surrounded by a lower index outer cladding 24 with a diameter of $d_2$. Compared to the DCF 10 of FIG. 1, the cladding diameter is such that $d_2 < d_1$. Also, the mode field diameter is also equal to approximately $2w_1$ for good mode matching with the single mode core 12 of the DCF 10.

In FIG. 3, the multimode fiber (MMF) 30 comprises a comparatively large core 32 surrounded by a lower index cladding 34 having a diameter $d_3$ and a numerical aperture $NA_3$ where $NA_3 < NA_1$ that permits the propagation of multiple modes.

Figure 4:
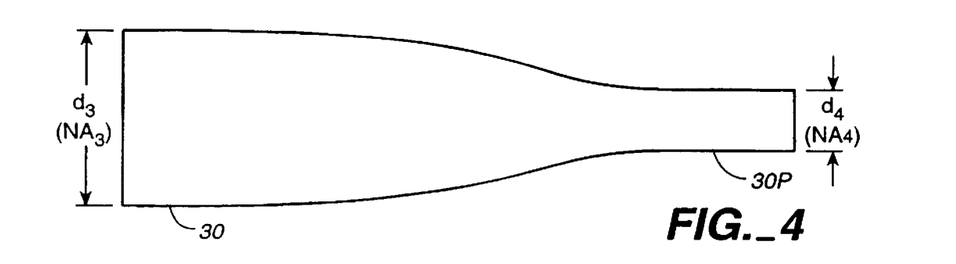
FIG. 4 is a descriptive illustration of steps 1–3 for forming the coupler from the pre-tapering of individual multimode fibers (MMFs).

A MMFs/DCF coupler is formed as follows with reference to FIG. 4 relative to three steps. In Step 1, a plurality of strands of multimode fiber (MMF) 30, each capable of coupling the light output from a multimode light source into a single DCF inner cladding 14, are individually pre-tapered at their end segments or portions 30P so that that N tapered MMFs, together with a single mode fiber (SMF) 20, will substantially match the diameter of the DCF 10. As previously indicated, the MMFs 30 have a diameter $d_3$ and an $NA_3$. Each fiber is heated at its end and pulled so that a resulting pulled diameter $d_4$ is formed at end 30P with a $NA_4$. The proper resulting $NA_4$ is achieved is as per following relationship:

$$NA_4 \approx \frac{d_3}{d_4} NA_3 \leq NA_1 \qquad (1)$$

In Step 2, a single strand of a SMF 20 may be etched to reduce its cladding diameter from $d_2$ to $d'_2$ without affecting the mode field diameter. This reduction of the SMF cladding 24 may be done in order to meet the diameter matching requirements of the DCF 10. The employment of Step 2 is optional and may be omitted.

Figure 4A:
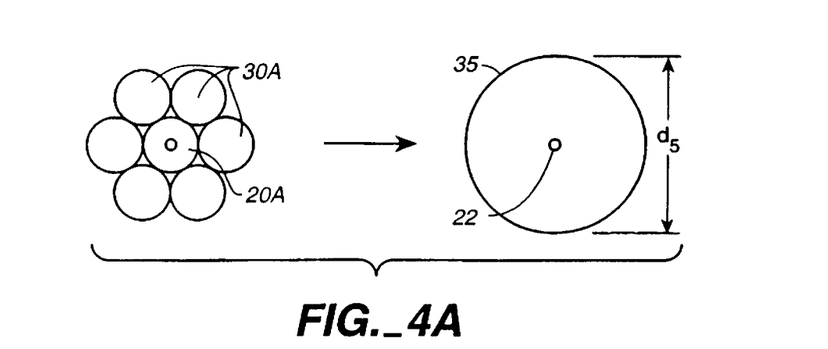

In Step 3, the taper segments of the plural MMFs 30A are equal laterally arranged around the SMF 20A and, then, the bundled fibers are fused together at a high temperature that will melt the glass fibers. As shown in FIG. 4A, N number (N=6) of MMFs 30A are arranged around a single SMF 20A. This is accomplished by clamping the MMFs/SMF bundle with a pair of spatially disposed clamps (not shown) and thereafter applying a gas burner having a flame output at round 1,000° C. below the bundled taper segments between the supporting clamps. The MMFs/SMF bundle may be rotated during this step so that the heat is uniformly applied to all circumferential surfaces of the clamped bundle. After completion of the fusing step, the mid section of the fused biconical bundle is carefully cut to provide a smooth end terminus, resulting in two fused MMFs/SMF bundles the end of one which is shown at 35 in FIG. 4A. The diameter of each of the bundle ends is $d_5$ where $d_5$ is approximately equal to the inner cladding diameter $d_1$ of the DCF 10. The resulting diameter $d_5$ is achieved employing the following relationship:

$$d_5^2 = N \times d_4^2 + d_2'^2 \qquad (2)$$

Figure 5:
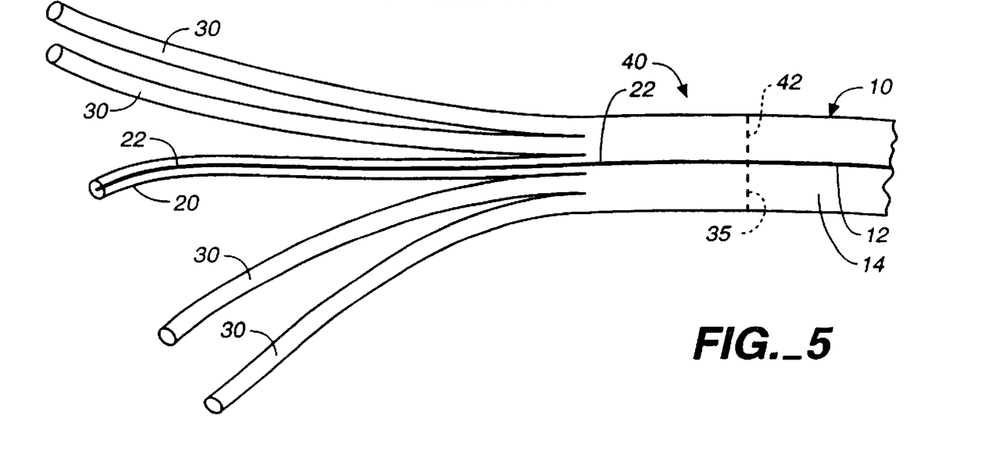
FIG. 5 is a descriptive illustration of step 4 for forming the coupler comprising this invention, together with a schematic view of a MMFs/SMF/DCF coupler comprising this invention.

In Step 5, the finished end terminus 35 of the MMFs/SMF fused bundle is butt coupled to the end of the DCF as shown at 42 in FIG. 5. This fusion splice 42 is made by first aligning the core 22 of the SMF 20 with the core 12 of DCF 10 and, thereafter, applying a high temperature flame to the splice region while these cores are held in proper alignment, forming the MMFs/SMF/DCF coupler 40. Other forms of high temperature devices or applications may be employed to form the splice.

Figure 6:
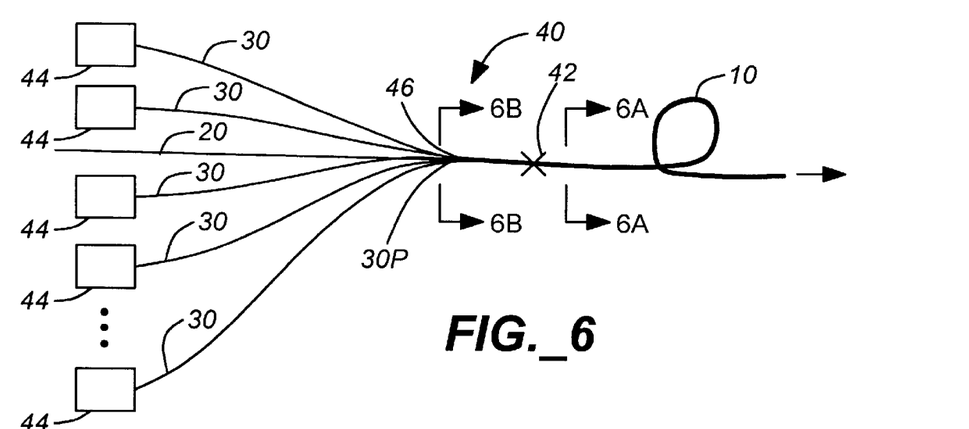
FIG. 6 is a further illustration of the MMFs/SMF/DCF coupler shown in FIG. 5.
Figure 6A:
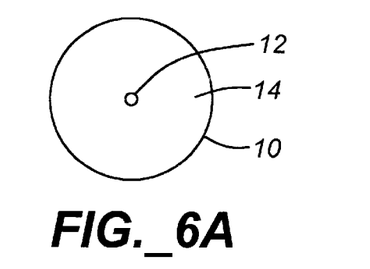
FIG. 6A is a cross section taken along line 6A—6A of FIG. 6.

The final MMFs/SMF/DCF coupler 40 is schematically depicted in FIG. 6. Coupler 40 is highly suitable for coupling multimode laser sources 44 together with the single mode fiber 20 as illustrated in FIG. 6. As shown in FIG. 6, six multimode pump laser sources 44 are coupled to six respective multimode fibers 30 with pre-tapered outer ends 30P. The tapered ends 30P are bundled around a single mode fiber 20 and, then, the fiber bundle is fused to form a tapered region 46 as illustrated in FIG. 6. During the fusing process, the bundled fibers may be pulled via one of the clamps to further reduce the coupler diameter to achieve the desire diameter $d_5$, or, alternatively, provide a tapered region 46 where the appropriate diameter $d_5$ may be selected along the length of taper region 46. A typical diameter $d_5$ is around 200 µm, which is a typical diameter for present day DCF inner claddings 14. FIG. 6 illustrates the coupler to include six MMFs 30. However, arrangements with as many as 12 to 18 MMFs 30 may be arranged around the SMF 20 in producing the MMFs/SMF/DCF coupler 40. Of course, the more MMFs 30 included in the bundle, the smaller the diameter $d_4$ of pre-tapered ends 30P of the multimode fibers, according to Equation (1).

Coupler 40 is fusion-spliced to a double clad fiber 10 which may function as fiber amplifier or a fiber laser (via formed fiber Bragg gratings) as is well known in the art.

It should be noted that the arrangement in FIG. 6 may be multimode fibers to a multimode fiber MMFs/MMF coupler, i.e., the single mode fiber 20 in FIG. 6 is removed, the fiber coupler 40 is formed as previously described, and the output end of the coupler is fusion-spliced to a multimode fiber 30 having a much larger NA than the NA of the individual multimode fibers.

Figure 7:
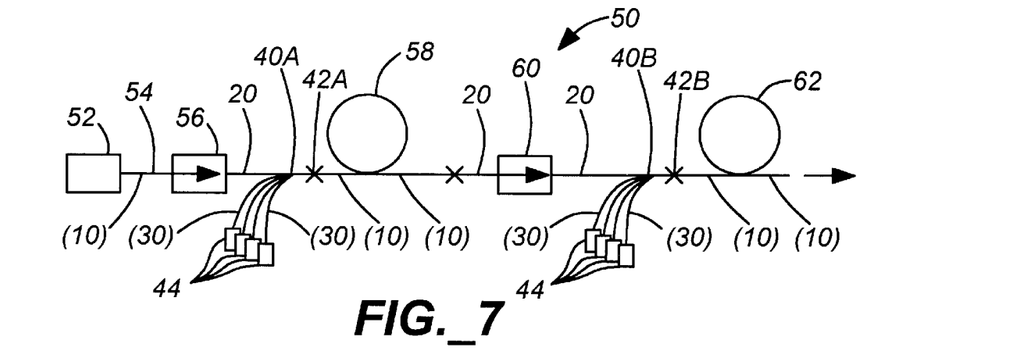
FIG. 7 is an illustration of an application of the MMFs/SMF/DCF coupler shown in FIG. 5 to a dual stage, fiber amplifier.

The MMFs/SMF/DCF coupler 40 is highly suitable for coupling multimode laser sources together with a single mode fiber to a double clad fiber gain medium as illustrated in FIG. 7. FIG. 7 shows a dual stage, high power amplifier system 50 driven into saturation and high power amplification with the use of multiple pump sources coupled into each of the fiber amplifiers. A master laser diode 52 functions as a signal source and provides an output signal $\lambda_s$, which may also be a modulated data source. The master laser diode output signal is coupled into the core of a single mode fiber 54 which is the center SMF 10 of the MMFs/SMF/DCF coupler 40. As shown, the master laser diode 52 is isolated from feedback light by isolator 56. The MMFs 30 of coupler 40A are individually coupled to a plurality of multimode laser sources 44, which may be individual laser emitters or a plurality of laser diode arrays. Coupler 40A is fusion-spliced at 42A to core-doped DCF 58 in a manner as previously explained. Its core 12 may be doped, for example, with Yb or Er, or codoped with such rare earth materials. Fiber 58 comprises a first stage fiber preamplifier. The amplified output of amplifier 58 is coupled via a single mode fiber to isolator 60 to a second stage power fiber amplifier 62 comprising a DCF having a doped core, such as doped with Yb or Er, or codoped with such rare earth materials as is known in the art. Multiple pump laser sources 44 are coupled to the inner cladding 12 of the second stage power amplifier 50 by means of coupler 42B as shown in FIG. 7. Coupler 40B is fusion-spliced at 42B to DCF 62 in a manner as previously explained.

The advantage of MMFs/SMF/DCF coupler 40 is that end pumping of a fiber amplifier can be combined with fusion spliced, single mode connections employing the fused fiber bundle coupler 40. Moreover, the fused fiber bundle coupler of this invention eliminates all free space optics from the optical fiber amplifier system 50, i.e., system 50 is an all-fiber multistage fiber amplifier system. Also, all optical interfaces between the components of the dual stage amplifier system can be fusion spliced without the use of free space optics. As a result, improved coupling efficiency with low insertion loss is achieved.

Figure 8:
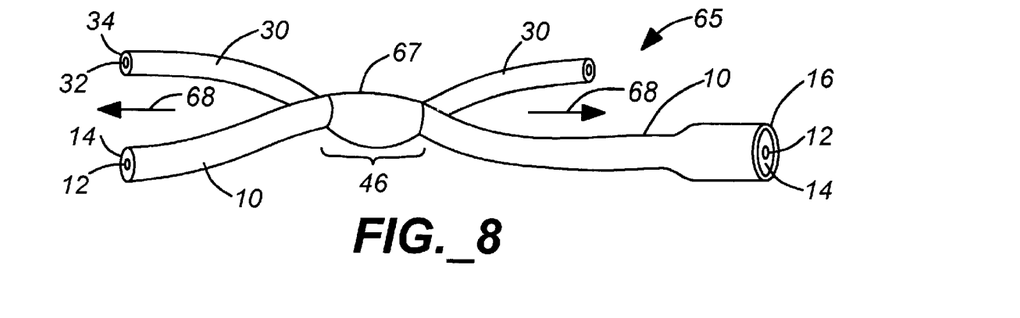
FIG. 8 is another embodiment comprising a MMF/DCF coupler.

FIG. 8 illustrates another embodiment comprising MMF/DCF coupler 65. In FIG. 8, MMF 30 is side-fused to a DCF 10 for the purpose of transferring pump light from the MMF 30 to the DCF inner cladding 14. The coupler 65 is formed by removing the outer cladding 16 from the DCF 10. Then segments of these fibers are partially or slightly side-twisted together at region 64. The side-twisted fibers are then fused together in region 64 at 67 employing a gas burner or other high temperature heat source while pulling the twisted fibers ends away from one another as indicated by arrows 68. Pump light from MMF 30 will couple into the DCF inner cladding 14 with an efficiency of approximately given by the ratio of the double clad fiber inner cladding cross-sectional area, $A_1$, to the sum of both the double clad inner cladding and the multimode fiber core cross-sectional areas, $$A_1 + A_2 \left( \frac{A_1}{A_1 + A_2} \right).$$

Alternatively, before twisting the MMF fiber coupling segment about the DCF fiber coupling segment, a portion of the MMF inner cladding 34 may be partially or substantially removed or tapered in the segment portion 46 of the MMF 30 where the multimode fiber is wrapped around DCF 10. This will improve the coupling efficiency of pump light from the core 32 of MMF 30 into inner cladding 14 of fiber 10.

Figure 9:
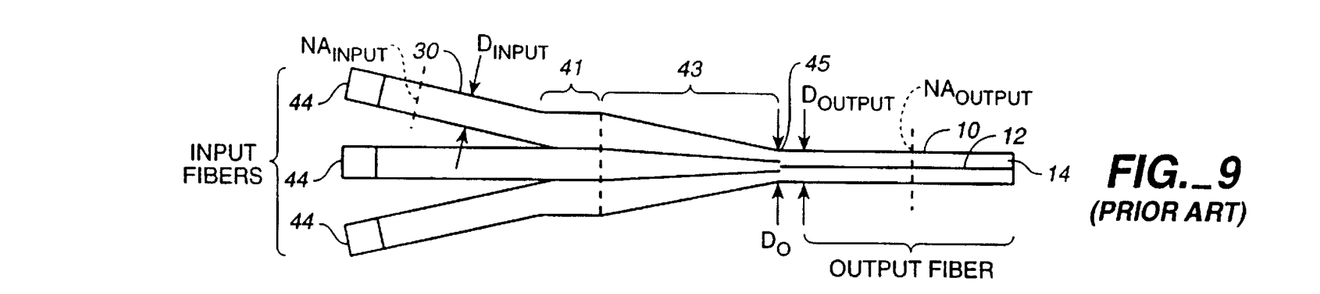
FIG. 9 is a schematic illustration of a coupler disclosed in the art.
Figure 14:
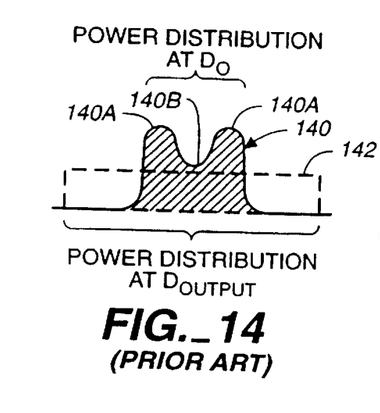
FIG. 14 is a schematic illustration of the power distribution for the coupler of the prior art as shown in FIG. 9.

Reference is now made to further improvements related to the formation and construction of coupler 40. The coupler of U.S. Pat. No. 5,864,644, incorporated herein by its reference, is shown in FIG. 9. Shown is a plurality of input multimode fibers 44, specifically seven in number, for coupling the light from laser diode sources into these respective fibers which light converges in bundled region 41. The coupler includes tapered region 43 which tapers to a minimum diameter, $D_0$, or waist 45. As explained in U.S. Pat. No. 5,864,644, the multimode fiber bundle tapers to a cross section approximating the inner cladding 14 of double clad fiber 10. Also, according to U.S. Pat. No. 5,864,644, there is a minimum cross section below which tapered region 43 should not fall below without incurring excessive losses. These losses are avoided by maintaining the condition:

$$\left( \frac{NA_{output}}{NA_{input}} \right)^2 \geq \frac{\sum A_i}{A'} \quad (3)$$

where $NA_{output}$ is the numerical aperture of the output cladding 14, $NA_{input}$ is the numerical aperture of an input multimode fiber 30, $\Sigma A_i$ is the summation of the cross sectional areas of the fibers as bundle region 41 and A' is the area of the minimum taper diameter at 45. In this approach, the diameter at waist 45 is matched substantially to the diameter of the output fiber, here inner cladding 14, i.e., $D_0 \approx D_{output}$ at 47 and $$D_0^2 \geq \left( \frac{NA_{input}}{NA_{output}} \right)^2 \times \sum D_i^2 \quad (4)$$

where $D_0$ is the diameter at the waist 45, $D_i$ is the diameter of the input multimode fiber 30, and $NA_{input}$ is the numerical aperture of an input multimode fiber 30 and $NA_{output}$ is the numerical aperture of the output cladding 14. However, with matching diameters of the tapered MMFs and the double clad fiber, the NA is largely unfilled and the power distribution is not uniform in the air-clad region of the coupler, i.e., in the vicinity of the waist 45. This is illustrated in FIG. 14 by the power distribution curve 140 which illustrates the power distribution across cladding 14 when a plurality of fibers are melted, tapered and fused together. Because some of the light in the taper is angular with respect to the central propagating axis of fiber 10 due to the bundling of fibers around a central fiber, the power distribution profile 140 will have higher side power profiles at 140A compared to the center of the fiber 140B. The power distribution at the output, $D_{output}$, illustrated at 142 is also not uniformly distributed. This invention provides for making this power distribution substantially uniform.

Figure 15A:
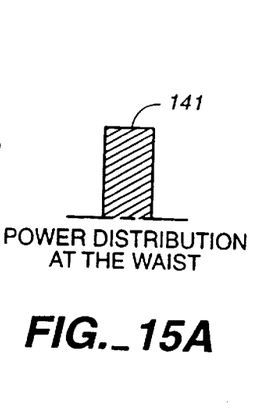
FIGS. 15A and 15B is a schematic illustration of the power distribution for the coupler comprising this invention as shown in FIG. 10 as compared to the coupler shown in FIG. 9.
Figure 15B:
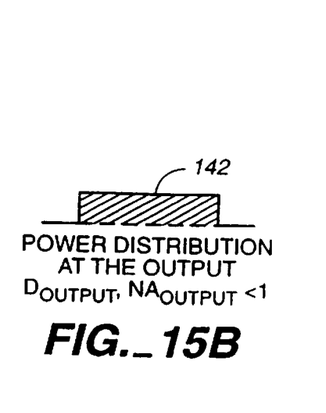

We have discovered that the coupling efficiency and the power distribution uniformity of optical power into the output fiber, such as double clad fiber inner cladding or multimode fiber core, from multiple multimode input fibers can be significantly improved by having the fiber bundle comprising the multimode input fibers forming a coupling region that monotonically tapers down to a minimum waist having a diameter, $D_0$, where the input light from the multimode input fibers substantially fills the entire numerical aperture (NA) of an air-clad region of the couple, where the NA≈1, and which is shown in FIG. 15A at 141. This waist at $D_0$ is followed by a diverging adiabatic diametrical portion of monotonical increasing diametrical extent, which may also be referred to as a negative taper (the reverse of positive-going taper of the monotonically decreasing taper of the coupler), the taper terminating at the nominal numerical aperture (NA) of the output fiber or fibers at diameter, $D_{output}$. The power distribution at the output is shown at 142 in FIG. 15B which is uniformly distributed so that the $NA_{output}$ will be completely filled in the output fiber. Different fabrication approaches can be utilized to achieve this result. While this approach contemplates cladding in the region of the waist and negative taper region to be air, it is within the scope of this invention to use other low index claddings at this region. Such an embodiment is shown in FIG. 10.

Figure 10:
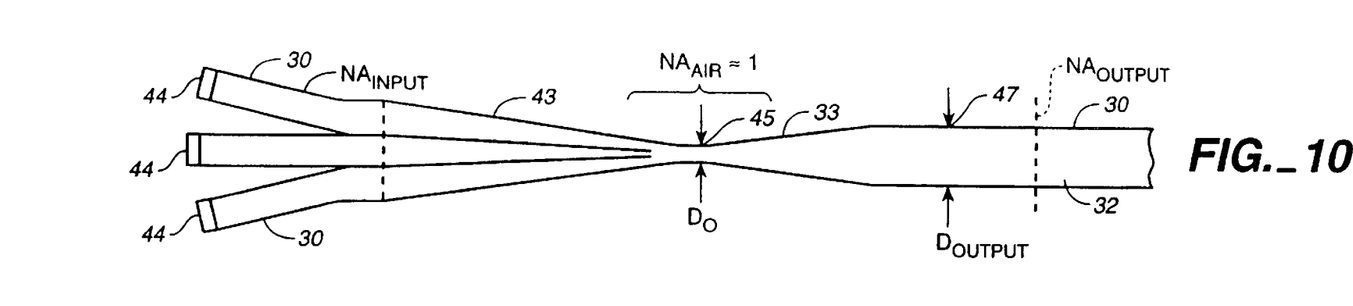
FIG. 10 is a schematic illustration of one form of a coupler comprising this invention.

FIG. 10 is similar to FIG. 9 so that like numbered components in FIG. 10 are the same as in FIG. 9, previously described comprising a plurality of multimode fibers, such as seven in number (Obviously, other numbers of multimode fibers may be employed). The coupler includes a first monotonically converging taper portion 43 and a second montonically diverging taper portion 33 in optical coupling communication with output fiber 30. However, the waist 45 in FIG. 10 is much small than the waist for the coupler of FIG. 9 and, importantly, further includes a monotonically increasing adiabatic taper 33 formed relative to the output fiber, shown here as a multimode fiber 30 comprising large diameter core 32. Also, in this approach, the diameter at waist 45 is less than the diameter of the output fiber, i.e., $D_0 < D_{output}$ at 47 and $$D_0^2 \approx \left( \frac{NA_{input}}{NA_{air}} \right)^2 \times \sum D_i^2 \quad (5)$$

where $D_0$ is the diameter at the waist 45, $D_i$ is the diameter of the input multimode fiber 30, and $NA_{input}$ is the numerical aperture of an input multimode fiber 30 and $NA_{air}$ is the numerical aperture of air, with $NA_{air} \approx 1$.

Thus, in utilizing this approach, the square of $NA_{air}$ over $NA_{input}$ is substantially equal to the summation of the cross sectional areas of the multimode fibers 30 in region 41 over the area of minimal taper diameter, $D_0$ at 45 or $$\frac{\sum A_i}{A'} \approx \left[ \frac{NA_{air}}{NA_{input}} \right]^2 > \left[ \frac{NA_{output}}{NA_{input}} \right]^2, \quad (6)$$

which is contrary to Formula (3) from U.S. Pat. No. 5,864,644.

As an example, the $NA_{output}$ for a 100 μm to 125 μm $D_{input}$ multimode fiber may be about 0.1 to 0.2, the NA at 45 may be $NA_{air}$ equal about 1 with a minimal diameter, $D_0$, in the range of 70 μm to 130 μm, and the $NA_{output}$ may be around 0.4 at $D_{output}$ at 47 where $D_{output}$ is equal to about 200 μm.

Figure 6B:
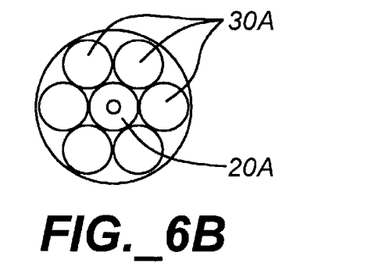
FIG. 6B is a cross section taken along line 6B—6B of FIG. 6.
Figure 16:
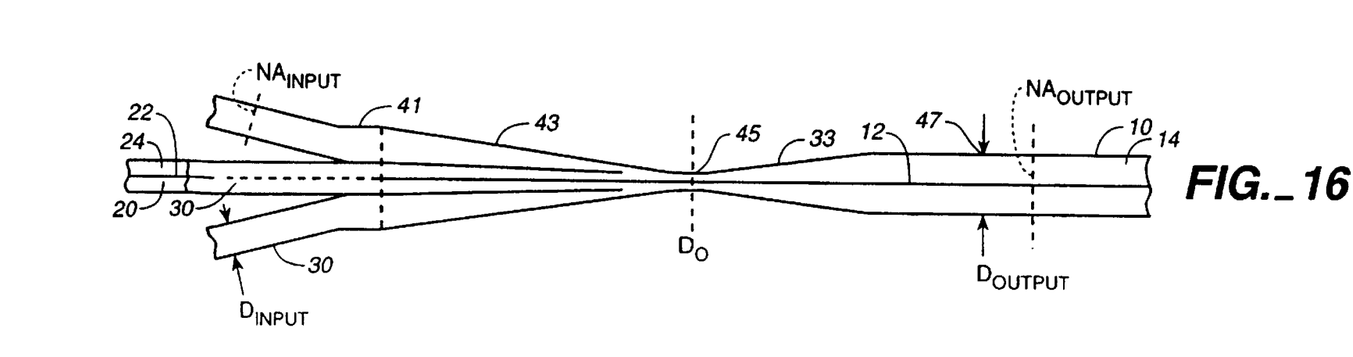
FIG. 16 is a schematic illustration of another form of the coupler comprising this invention.

FIG. 16 is another embodiment of the invention similar in coupler construction to that shown in FIG. 10 except for the inclusion of a single mode fiber 20 within the bundle of multimode fibers 30, such as illustrated in the cross section view of FIG. 6B. The coupler includes a first monotonically converging taper portion 43 and a second montonically diverging taper portion 33 in optical coupling communication with output fiber 10. In optically coupling the fiber bundle 41 to the output fiber 10 the cores 22 and 12 of the single mode fiber 22 and double clad fiber 10, respectively, are aligned together prior to performing a fusion-splice between them. The coupler of FIG. 16 has particular relevance for amplifying a signal propagating in single mode fiber core 22 where double clad fiber 10 has a rare earth doped core and functions as an amplifier for the signal as is well known in the art. The pump light is provided via multimode fibers coupled to laser diode pumping sources 44 and the pump light uniformly fills the NA of inner cladding 14 due to performance of coupler waist 45.

Figure 11A:
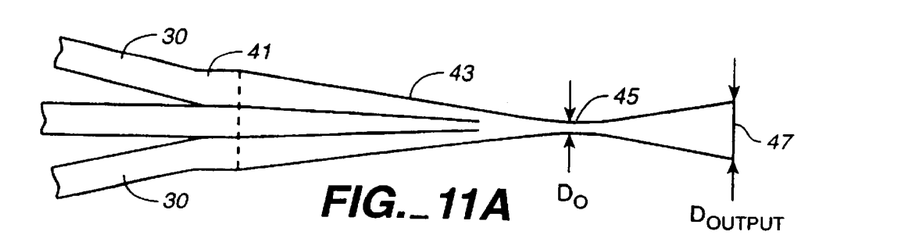
FIGS. 11A and 11B are schematic illustrations of a first approach for forming the coupler comprising this invention.
Figure 11B:
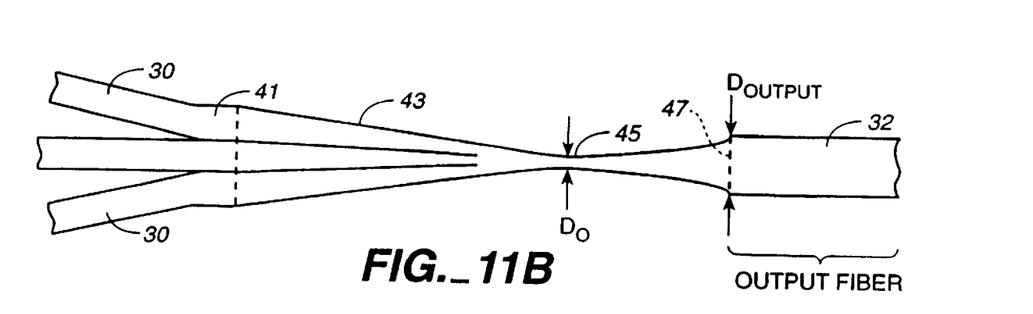

In FIGS. 11A and 11B, there is illustrated an approach for forming the negative-going or monotonically increasing taper comprising this invention. The positive taper 43 of fiber bundle 41 has a minimum diameter, $D_0$, at 45 and then expands in a monotonic manner to a larger diameter, $D_{output}$, at 47 so that $D_{output} > D_0$. The area of output at face 47 is cleave-point where $D_{output}$ is substantially equal to the core diameter of the output fiber, which may be, for example, a multimode fiber.

As shown in FIG. 11A, the fiber bundle 41 is melted, fused and the taper is formed as known in the art by pulling in opposite directions the fiber bundle so that opposite, symmetrical fiber bundles (not shown) are formed with an intermediate taper section between the bundles having at least one point in the taper joining together the bundles with the desired minimal diameter, $D_0$, shown at 45 in FIG. 11A. However, the cleave is made in the taper at 47 between the bundles away from waist 45 where the diameter, $D_{output}$ matches the diameter of the output fiber light propagating core or cladding. As shown in FIG. 11B, output face 47 is fusionspliced to the output fiber, here shown as multimode core 32. As previously indicated, a plurality of multimode fibers 30 may be melted and fused together to form a taper having a diameter, $D_{output}$, which is fused at cleave point 47 in FIG. 11A. This multi-fiber output coupler arrangement would, therefore, function as an optical splitter where power that has been uniformly distributed through its travel trough waist 45 is uniformly distributed into the multiple fused output fibers 30 coupled at point 47.

Waist 45 provides a mechanism for filling the NA at the coupler waist so that the power distribution of the light from the multiple multimode fibers will be uniform at this point and thereafter uniformly diverge into the NA of the output fiber.

Figure 12A:
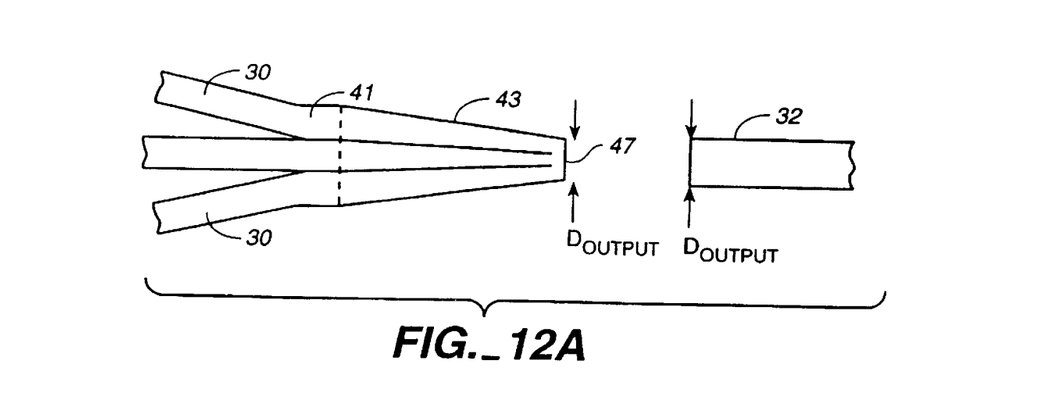
FIGS. 12A and 12B are schematic illustrations of a second approach for forming the coupler comprising this invention.
Figure 12B:
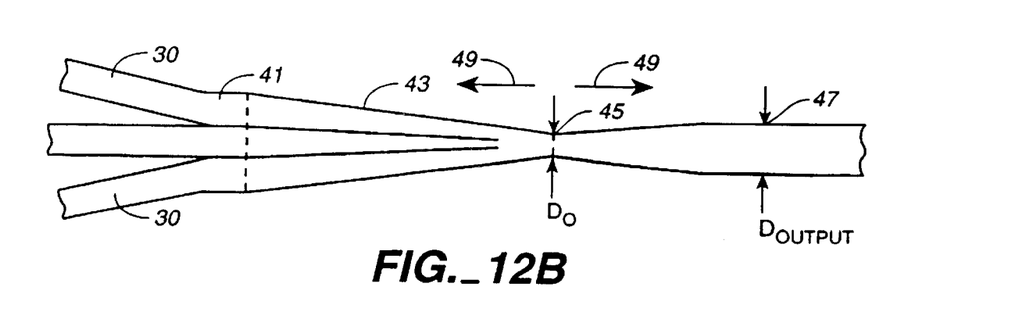

A further approach is shown in FIGS. 12A and 12B. In this approach, the fiber bundle 41 is initially tapered down to form the taper 43 and then cleaved at a point where the size of the taper is substantially equal to the diametrical size of the output fiber or fibers (the latter fibers may also be bundled and fused and pulled to form a taper), i.e., $D'_0 = D_{output}$ at 47. Then, the cleaved taper bundle 43 is fusion-spliced to output fiber or fibers, in the case here shown fused to multimode core 32. Then, the coupler region is heated to molten state and held coupler ends are pulled, as indicated by arrows 49 until the minimal diameter $D_0$ is achieved at waist 45 according to formula (5) above.

Figure 13A:
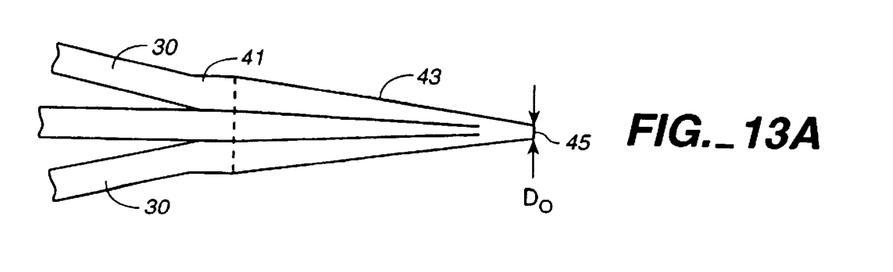
FIGS. 13A, 13B and 13C are schematic illustrations of a third approach for forming the coupler comprising this invention.
Figure 13B:
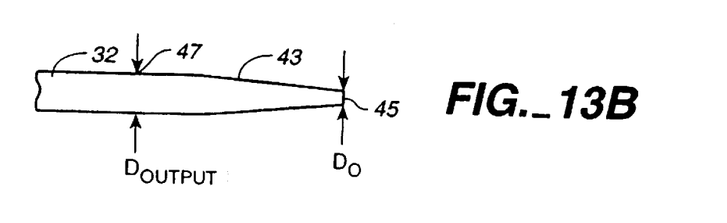
Figure 13C:
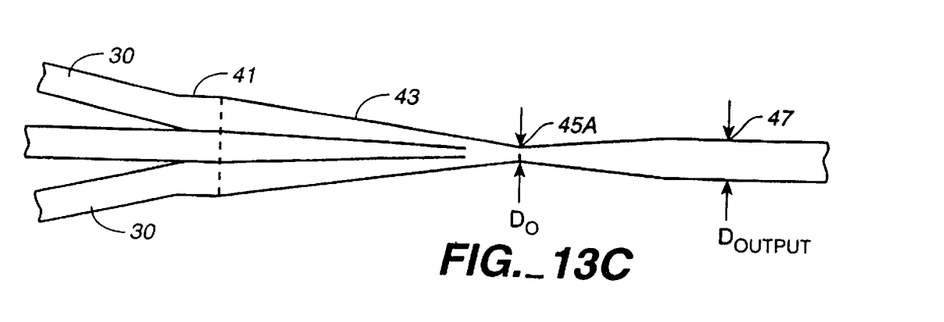

A further approach is shown in FIGS. 13A–13C. As shown in FIG. 13A, the bundle taper 43 is formed and cleaved at the desired diameter, $D_0$. Also, the output fiber is tapered at 43A down to the desired diameter, $D_0$, in the case here shown as multimode core 32. The formation of tapers 43 and 43A is performed in the same way as known to those skilled in the art. The fiber or fibers are heated into a molten state and pulled in opposite directions as taught in the art. To achieve the desired diameter along the taper of the output fiber, a cleave may be performed at the proper location along its taper were the diameter is $D_0$. Also, as previously indicated, the output fiber may be a group of output fibers that have been tapered and cleaved at the desired diameter, $D_0$. Then, as shown in FIG. 13C, the two ends of the prepared bundled fiber taper 43 and the output fiber are fused together at the point of prepared minimal diameter as shown at 45A.

The enhancement of the power distribution uniformity of the coupler by means of a negative taper formed after the minimal diameter, Do, may be applied to N×1 or N×M fused biconical taper (FBT) fiber optic combiners or fiber optic splitters to significantly improve the light distribution in the output by tapering the fiber bundle forming the coupler down to a minimal diameter where the input light into the coupler will substantially fill the entire NA of the air-clad region around the coupler (NA=1), followed by a diametrical adiabatic increase up to the nominal diameter or area of the output fiber or fibers.

Although the invention has been described in conjunction with one or more preferred embodiments, it will be apparent to those skilled in the art that other alternatives, variations and modifications will be apparent in light of the foregoing description as being within the spirit and scope of the invention. Thus, the invention described herein is intended to embrace all such alternatives, variations and modifications as that are within the spirit and scope of the following claims.

What is claimed is:

1. An optical coupler comprising:

an output optical fiber having a input end of cross-sectional dimension $D_{out}$ end into which optical pumping energy is supplied;

a plurality of multimode optical fibers having input ends into which optical pumping energy is coupled, said multimode optical fibers being formed into a tapered bundle that tapers to a waist portion having a cross-sectional dimension $D_{waist}$ less than $D_{out}$, so that optical pumping energy coupled to said input ends of plurality of multimode optical fibers is coupled to said waist portion of said tapered bundle; and a diverging taper waist portion-to-input end of output optical fiber coupler having a first end of cross-sectional dimension $D_{waist}$ that adjoins said waist portion of said tapered bundle, and having an increasing taper that diverges from said waist portion in the direction of transport of optical pumping energy therefrom to a termination having a cross-sectional dimension $D_{out}$ and adjoining said input of said output optical fiber, so that said optical pumping energy supplied to said input ends of plurality of multimode optical fibers and propagating therethrough to said waist portion of said tapered bundle is coupled through said diverging taper waist portion-to-input end of output optical fiber coupler, so as to substantially fill and be uniformly distributed into the numerical aperture of said input end of said output optical fiber.

2. The optical coupler according to claim 1, wherein said output optical fiber is a multimode optical fiber.

3. The optical coupler according to claim 1, wherein said output optical fiber comprises a plurality of optical fibers combined to said cross-sectional dimension $D_{out}$.

4. The optical coupler according to claim 1, wherein said output optical fiber is a double clad optical fiber.

5. The optical coupler according to claim 1, further including a single mode optical fiber formed into said tapered bundle of said plurality of multimode optical fibers, and wherein said optical fiber is a double clad optical fiber.

6. The optical coupler according to claim 5, wherein said double clad optical fiber provides optical gain to a signal transported through a core thereof.

7. The optical coupler according to claim 1, wherein said a diverging taper waist portion-to-input end of output optical fiber coupler contains said multimode optical fibers.

8. The optical coupler according to claim 1, wherein said a diverging taper waist portion-to-input end of output optical fiber coupler contains said output optical fiber.

9. A method of forming an optical coupler comprising the steps of:

providing a single mode optical fiber;

providing a plurality of multimode optical fibers;

tapering portions of a plurality of multimode optical fibers to a prescribed taper, so that an end of an optical fiber bundle formed by fusing tapered portions of said plurality of multimode optical fibers about said single mode optical fiber has a predetermined diameter;

bundling tapered portions of said plurality of multimode optical fibers about said single mode optical fiber to form an optical fiber bundle;

fusing optical fibers of said optical fiber bundle together; and adjoining an end of double clad optical fiber having an inner cladding of said predetermined diameter to said end of said predetermined diameter of said optical fiber bundle.

10. The method according to claim 9, wherein said end of said double clad optical fiber is adjoined to said end of said optical fiber bundle by fusion splicing.

11. The method according to claim 9, further including reducing the diameter of an end-to-end joint between said end of said double clad optical fiber and said end of said optical fiber bundle to less than said predetermined diameter.

12. The method according to claim 9, further including heating and pulling an end-to-end joint between said end of said double clad optical fiber and said end of said optical fiber bundle so as reduce the diameter of said end-to-end joint to less than said predetermined diameter.

* * * * *

UNITED STATES PATENT AND TRADEMARK OFFICE
CERTIFICATE OF CORRECTION

PATENT NO.    : 6,434,302 B1                                         Page 1 of 1
DATED         : August 13, 2002
INVENTOR(S)   : Fidric et al.

It is certified that error appears in the above-identified patent and that said Letters Patent is hereby corrected as shown below:

Column 10,
Line 37, "$D_{out}$ end" should read -- $D_{output}$ and --
Lines 43, 54 and 67, "$D_{out}$" should read -- $D_{output}$ --

Signed and Sealed this

Third Day of December, 2002

JAMES E. ROGAN
*Director of the United States Patent and Trademark Office*